US 6,634,251 B2

United States Patent
Chen

(10) Patent No.: US 6,634,251 B2
(45) Date of Patent: Oct. 21, 2003

(54) STRENGTH-SAVING STEERING MECHANISM FOR BICYCLES

(76) Inventor: Tseng-Hsien Chen, No. 351, Luo Chuang St., Luo Tung Jen, I Lan Hsien (TW)

( * ) Notice: Subject to any disclaimer, the term of this patent is extended or adjusted under 35 U.S.C. 154(b) by 34 days.

(21) Appl. No.: 10/051,126

(22) Filed: Jan. 22, 2002

(65) Prior Publication Data

US 2003/0136216 A1 Jul. 24, 2003

(51) Int. Cl.[7] .............................................. B62K 21/18
(52) U.S. Cl. ............................ 74/492; 74/548; 74/496; 280/279
(58) Field of Search ..................... 74/548, 491, 492, 74/496; 280/279

(56) References Cited

U.S. PATENT DOCUMENTS

| | | | | |
|---|---|---|---|---|
| 4,108,460 A | * | 8/1978 | Silva, Jr. .................... 280/236 |
| 4,447,069 A | * | 5/1984 | Winiecki et al. ............ 280/270 |
| 4,540,189 A | * | 9/1985 | Tanaka ........................ 280/270 |
| 4,685,694 A | * | 8/1987 | Kouyama .................... 280/270 |
| 5,201,538 A | * | 4/1993 | Mayn ....................... 280/288.1 |
| 5,485,893 A | * | 1/1996 | Summers ..................... 180/219 |
| 6,122,991 A | * | 9/2000 | Clarkson .................... 74/551.8 |

* cited by examiner

*Primary Examiner*—David A. Bucci
*Assistant Examiner*—Julie K. Smith
(74) *Attorney, Agent, or Firm*—Rosenberg, Klein & Lee

(57) ABSTRACT

A strength-saving steering mechanism for bicycles includes a H-shaped tube with a vertical insert pipe deposed at the inner end of a bar pipe of the H-shape tube. The vertical insert pipe is inserted in one upper end of a steering shaft pipe, which connects to a front wheel. The H-shaped tube is further equipped with a hollow vertical pipe and connected pivotally to an inside tube through an upper and a lower bearing. A vertical handle rod is inserted internally in one upper end of the inside tube and a positioning block is connected to one lower end of the inside tube. The steering shaft pipe is driven by a horizontal handle rod via the vertical handle rod and the connecting rod. Ratios of turning angles of the horizontal handle rod and the vertical handle rod exist for saving the strength.

3 Claims, 7 Drawing Sheets

STRENGTH-SAVING STEERING MECHANISM FOR BICYCLES

BACKGROUND OF THE INVENTION

1. Field of the Invention

The present invention relates to a strength-saving steering mechanism for bicycles, and more particularly, to a steering mechanism that is positioned toward the driving direction a little bit for the purpose of strength-saving and changing directions more precisely.

2. Description of the Prior Art

As shown in FIGS. 1 and 2, a steering mechanism mounted on a front axle of a prior art bicycle comprises a triangle-shaped bicycle body 11. A front standpipe 12 is set at the front end of the bicycle body 11 and a steering shaft pipe 13 extends through the front standpipe 12. A front wheel outrigger is disposed at the lower end of the steering shaft pipe 13, while a handle 14, for moving the steering shaft pipe 13, is disposed at the upper end of the steering shaft pipe 13. The handle 14 comprises a vertical pipe that has an inclined plane at its lower end. The steering shaft pipe 13 comprises a positioning block internally that also has an inclined plane at its upper end. The vertical pipe is inserted in the steering shaft pipe 13 and incorporates its inclined plane with the inclined plane of the positioning block. A screw extends through the vertical pipe from its upper end and is used to lock the positioning block. Since the size of the inner diameter of the positioning block is as same as that of the steering shaft pipe 13, the vertical pipe inclined plane pushes the positioning block to drive the steering shaft pipe 13 when the rider turns the handle 14, as the dotted lines of FIG. 2.Preferably, 45-degree angle of turning right and left is the best operation mode for steering the steering shaft pipe 13 as shown as in FIG. 2. Depending on the road situations, turning right or left with almost 90 degrees is possible. However, much more strength is required to turn the handle because the steering shaft pipe 13 is the rotating center and directions of the prior art bicycle can only be controlled by the handle of the steering shaft pipe 13. For the purpose of solving the strenuous steering problem, the present invention provides a steering mechanism capable of meeting the demand of easy control and developing a new type bicycle with more practical functions.

SUMMARY OF THE INVENTION

The primary object of the present invention is to provide a strength-saving steering mechanism for bicycles. The handle of the present invention steering mechanism for controlling the moving directions is positioned forward a little bit in comparison with prior arts, and, therefore, the present invention can shorten the total length of the bicycle body through the design of indirect driving function, rather than bending rider's body forward for operation. For this purpose, the handle is not connected to a steering shaft pipe directly any more and, thus, most part of the reacting force from the ground is offset by the bicycle body. As this result, the human body does not sustain the reacting force on him any more. Thus, the rider is able to carry out the steering with less strength while the handle is disposed almost on the same position. Furthermore, the handle and bicycle body of the present invention share the same rotating part and a H-shaped tube for connecting with the connecting rod is included in the present invention. The major characteristic of the present invention is that the H-shaped tube rotates synchronously with the steering shaft pipe for the strength-saving purpose.

To achieve the aforementioned object, the present invention comprises a H-shaped tube with a vertical insert pipe deposed at the inner end of a bar pipe of the H-shape tube. The vertical insert pipe is inserted in one upper end of a steering shaft pipe connected to a front wheel. The H-shaped tube is further equipped with a hollow vertical pipe connected pivotally to an inside tube through an upper and a lower bearing. A vertical handle rod is inserted internally in one upper end of the inside tube and a positioning block is connected to one lower end of the inside tube. The vertical handle rod and the positioning block are connected with a bolt. The vertical pipe protrudes from one lower end of the inside tube and connects to one end of a connecting rod through a positioning sheet. The other end of the connecting rod connects to a steering sheet, which further connects to the steering shaft pipe that extends internally through a front standpipe of the bicycle body. The steering shaft pipe is driven by a horizontal handle rod via the vertical handle rod and the connecting rod.

BRIEF DESCTIPTION OF THE DRAWINGS

The foregoing and other features and advantages of the present invention will be more clearly understood from the following detailed description of a preferred embodiment and the accompanying drawings, in which.

BRIEF DESCRIPTION OF THE PREFERRED EMBODIMENT

Figure 1:
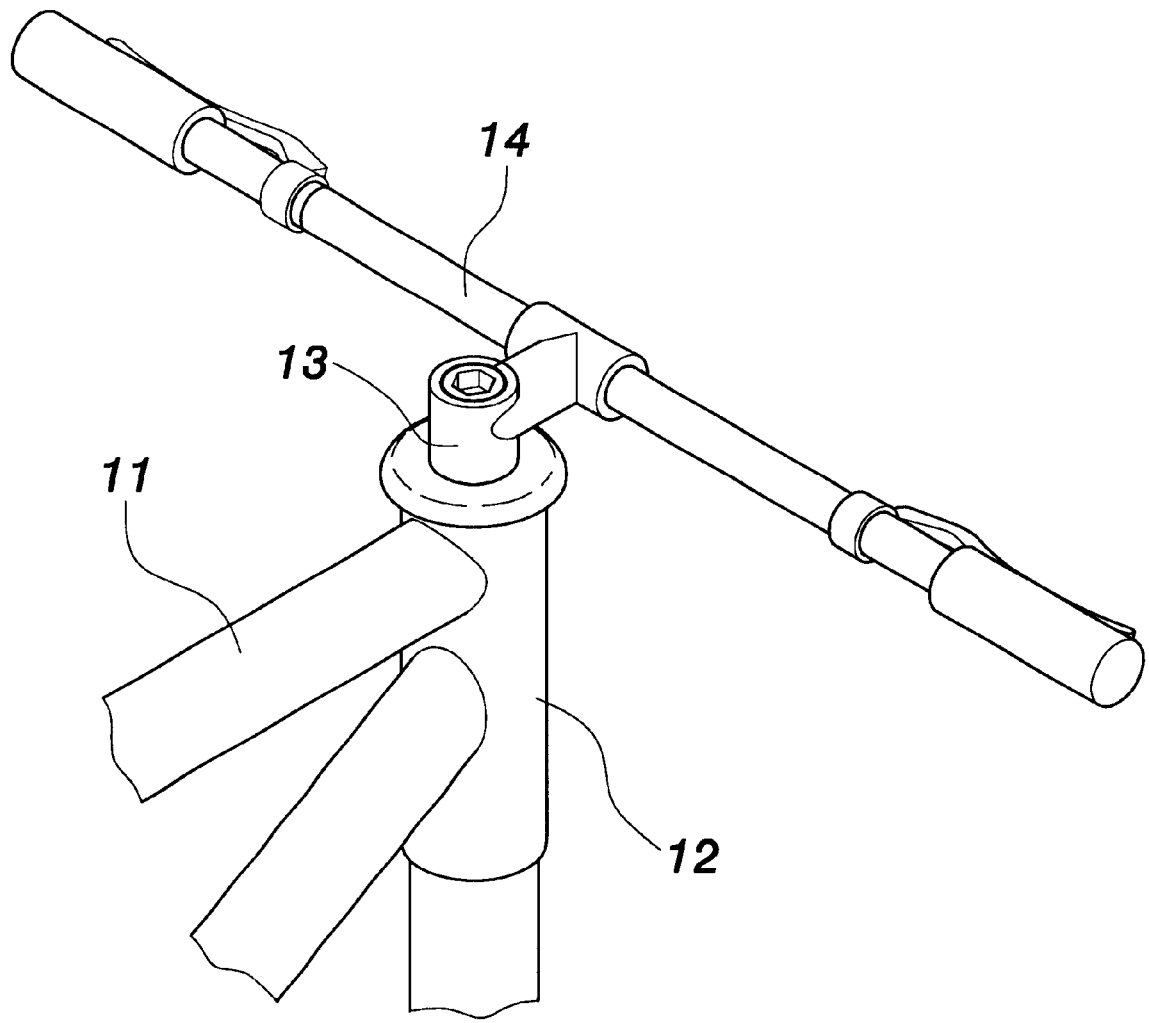
FIG. 1 is a 3D view of a prior art steering mechanism.
Figure 2:
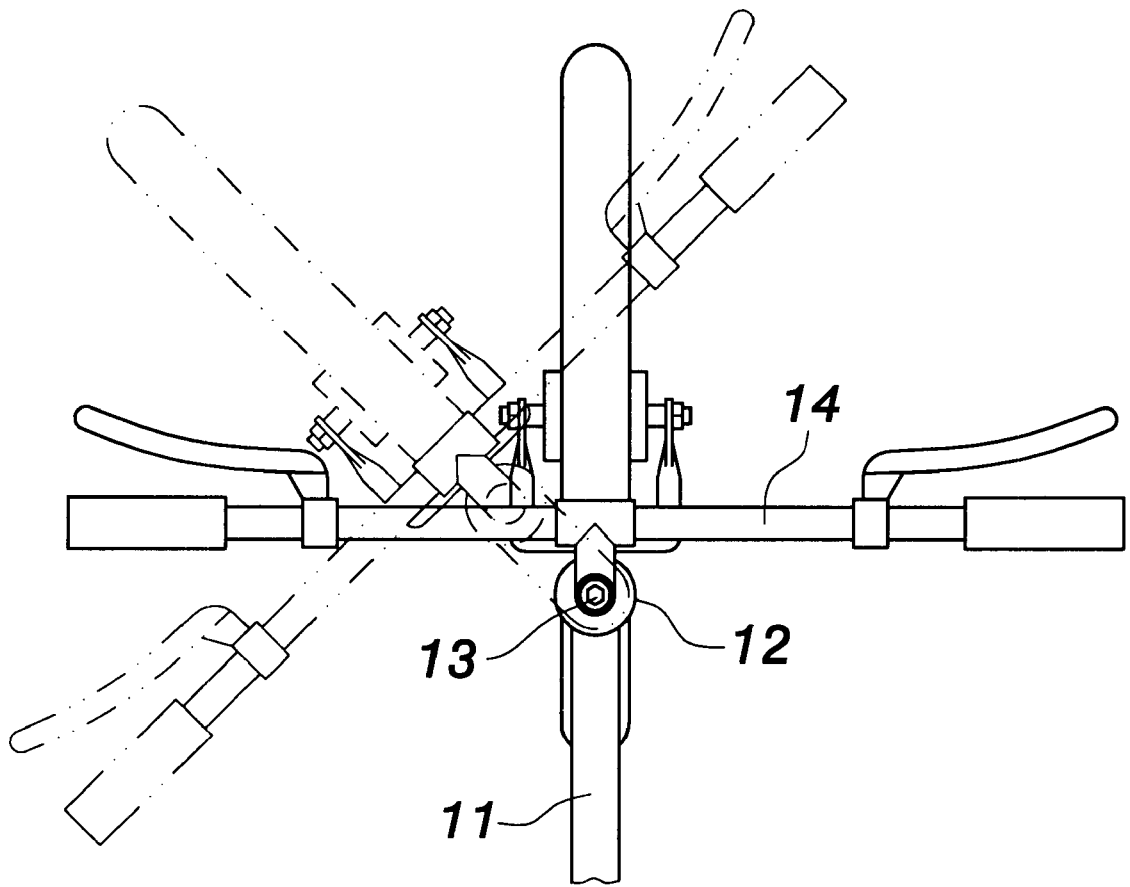
FIG. 2 is a top view of the prior art steering mechanism.
Figure 3:
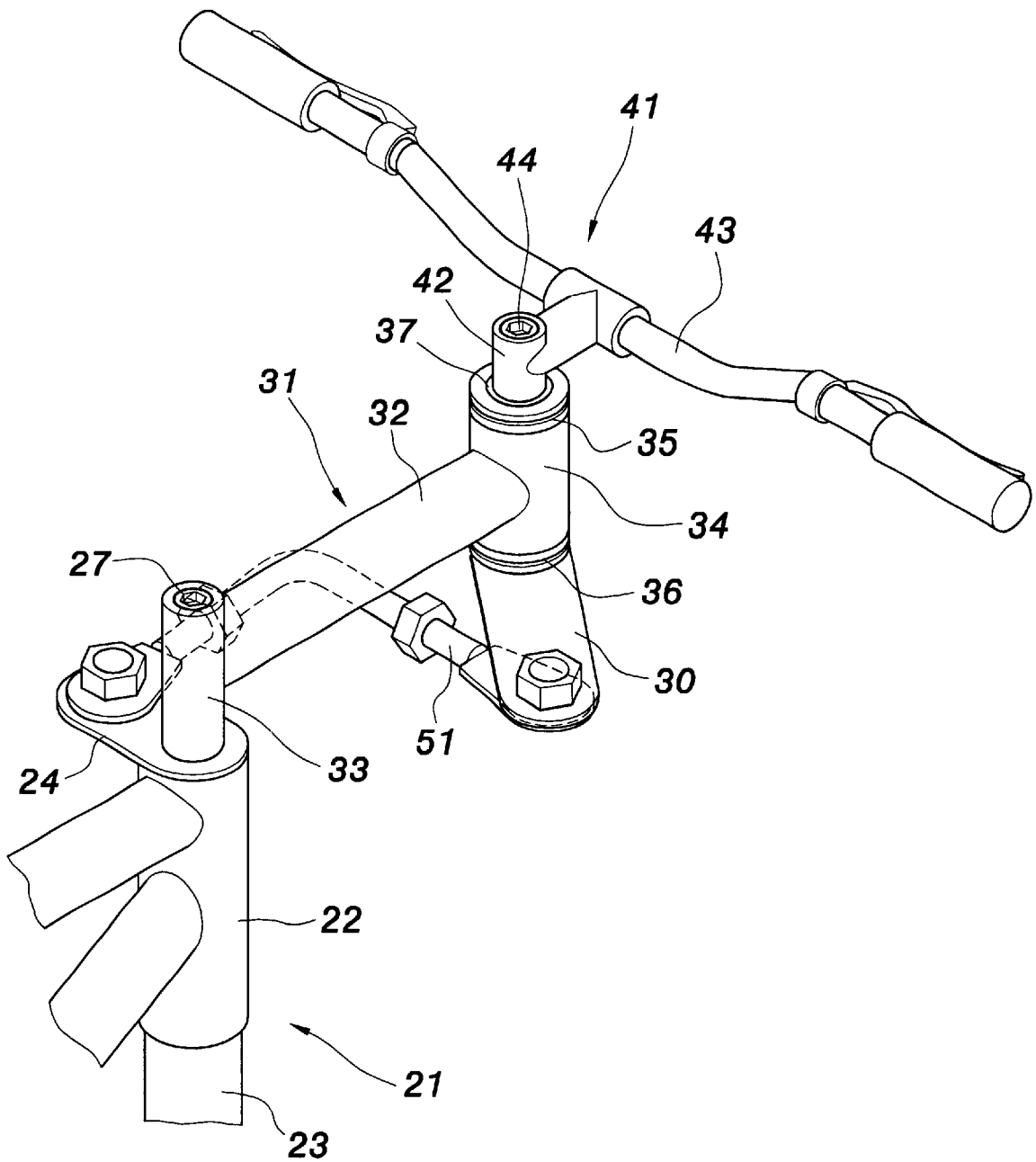
FIG. 3 is a 3D view of the present invention.
Figure 4:
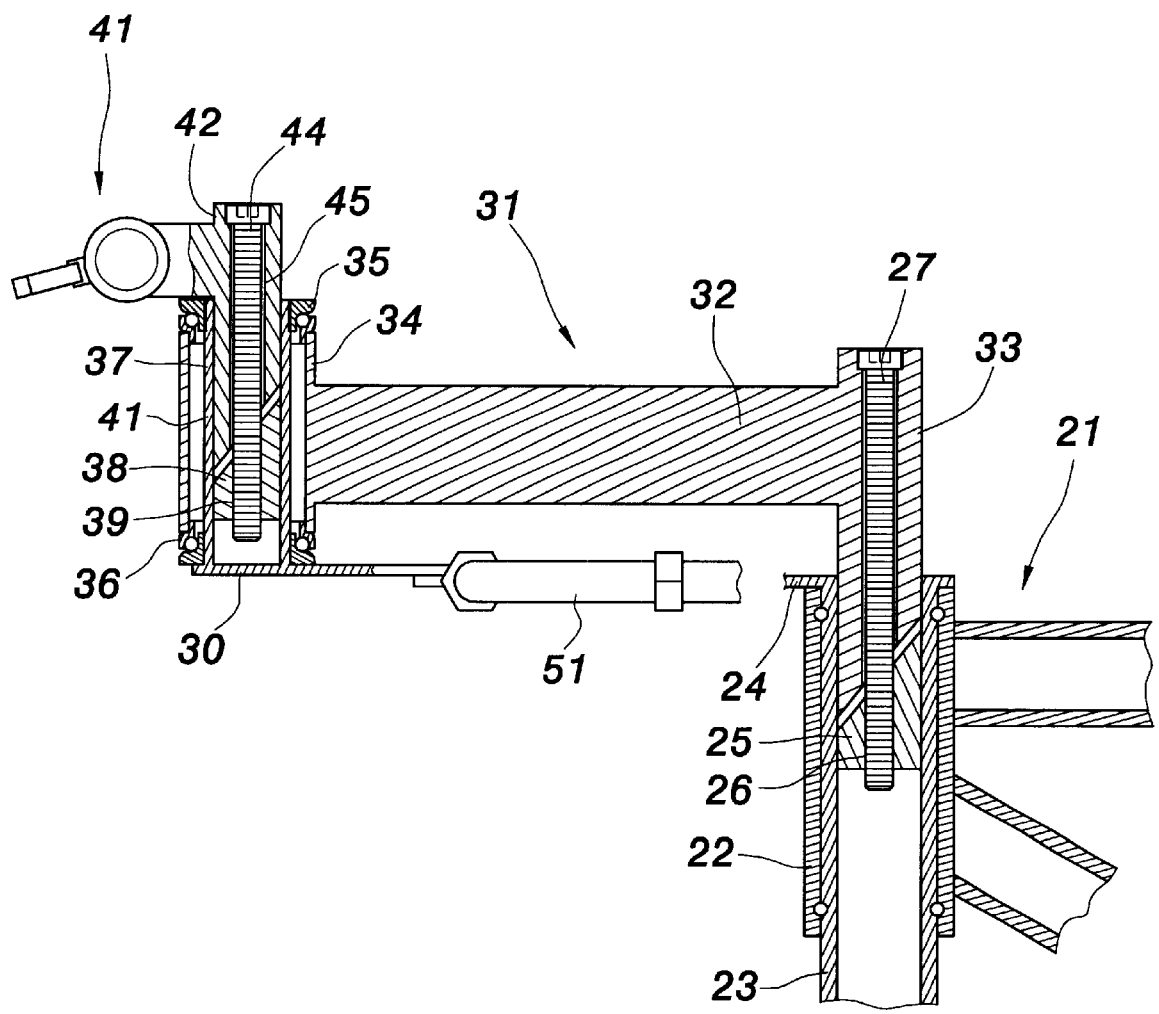
FIG. 4 is a cross-sectional view of the present invention.
Figure 5:
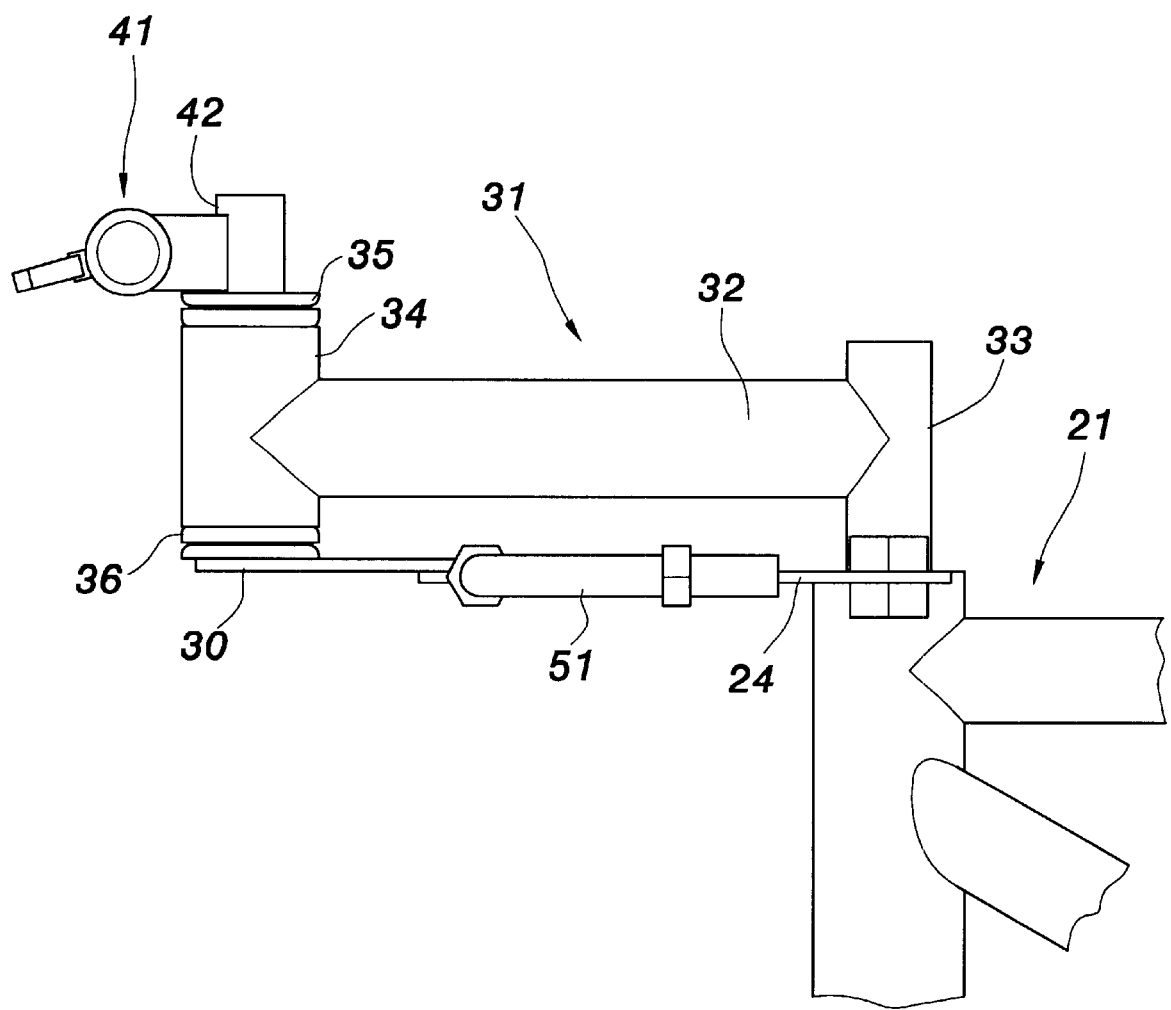
FIG. 5 is a side view of the present invention.

As shown in FIGS. 3 to 5, the present invention relates to a strength-saving steering mechanism for a bicycle. The bicycle has a bicycle body 21 with a front standpipe 22. A steering shaft pipe 23 extends internally through the front standpipe 22 and a steering sheet 24 connects to one end of the steering shaft pipe 23.

The bicycle further comprises a H-shaped tube 31. A vertical insert pipe 33 is connected to an inner end of a bar pipe 32 of the H-shaped tube 31, while a vertical pipe 34 is connected to an outer end of the bar pipe 32. The vertical insert pipe 33 is inserted in one upper end of the steering shaft pipe 23. The hollow vertical pipe 34 of the H-shaped tube 31 is connected pivotally to an inside tube 37 through an upper bearing 35 and a lower bearing 36.

A vertical handle rod 42 of a handle 41 is inserted internally in one upper end of the inside tube 37 and a positioning block 38 is connected to one lower end of the inside tube 37. A bolt 44 is screwed through a through hole 45 to connect the vertical handle rod 42 and the positioning block 38. The hollow vertical pipe 34 protrudes from one lower end of the inside tube 37 and connects to one end of a connecting rod 51 through a positioning sheet 30. The other end of the connecting rod 51 connects to the steering sheet 24, which further connects to the steering shaft pipe 23 that extends internally through the a front standpipe 22 of the bicycle body 21. A front wheel outrigger is disposed at one lower end of the steering shaft pipe 23, which and is driven by a horizontal handle rod 43 via the vertical handle rod 42 and the connecting rod 51. The lower end of the vertical handle rod 42 is an inclined plane and the upper end of the positioning block 38 is also an inclined plane, so the bolt 44 extends through the positioning block 38 to a tapped hole 39 after the two inclined planes are incorporated.

The vertical pipe 34 protrudes from the lower end of the inside tube 37 and connects to one end of the connecting rod 51 through the positioning sheet 30. The other end of the connecting rod 51 connects to the steering sheet 24. A front wheel outrigger is disposed at one lower end of the steering shaft pipe 23 that connects pivotally to the front wheel. The vertical handle rod 42 is connected to the horizontal handle rod 43. When the horizontal handle rod 43 drives the vertical handle rod 42, the steering shaft pipe 23 is also driven via positioning block 38, inside tube 37, connecting rod 51 and steering sheet 24, as shown in FIGS. 6 to 7.

One lower end of the vertical insert pipe 33 is an inclined plane, as well as one upper end of the positioning block 25. A fixing block 25, with a tapped hole 26, is disposed in the steering shaft pipe 23 for connecting the upper end of the vertical insert pipe 33 through the fixing screw 27.

Figure 6:
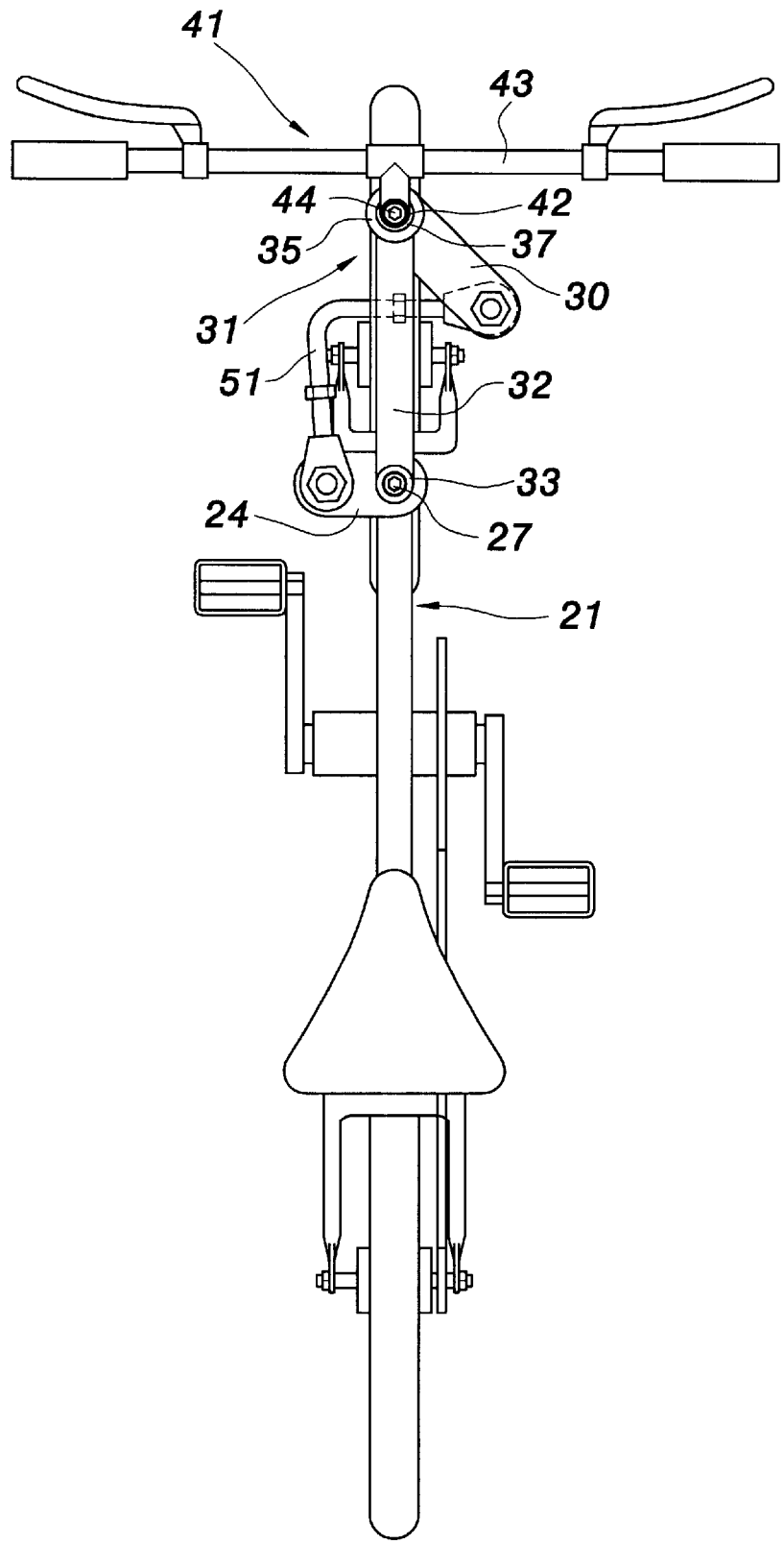
FIG. 6 is a top view of the present invention before changing the direction.
Figure 7:
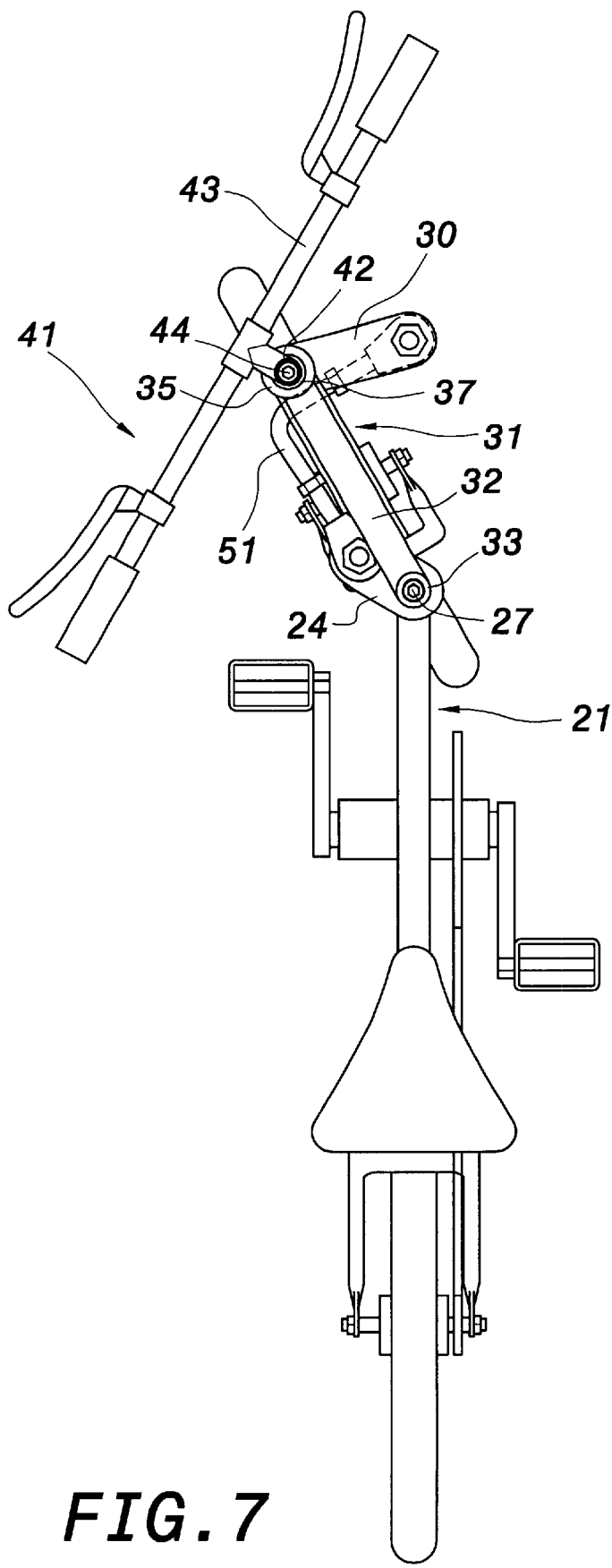
FIG. 7 is a top view of the present invention changing the direction.

FIG. 6 shows a top view of the present invention before changing directions. The appearance of the bicycle is very similar to a prior art bicycle, but thanks to the less force imposed on rider's hands, the rider can ride the bicycle with the present invention more easily. This is the first difference between the present invention and the prior art bicycle. Further as shown in FIG. 7, the rider needs only to turn the handle 41 to rotate the H-shaped tube and the steering shaft pipe 23 simultaneously. Not only do the H-shaped tube and the steering shaft pipe 23 change their original moving directions, e.g., straight, but also the bar pipe 32 changes When the distance from the joint of the positioning sheet 30 and the connecting rod 51 to the axis of the vertical pipe 34 is two times the distance from the joint of the steering sheet 24 and the connecting rod 51 to the axis of the front stand pipe 22, two degrees of rotating the horizontal handle 41 will drive the steering shaft pipe 23 to rotate with just one degree. Please note that values of the rotating degrees disclosed here are just one preferred combinations. Other embodiments with different rotating degree ratios also can be achieved for any average skilled person in this technical field. Preferably, 90 degrees turns of the horizontal handle 41 results in 45 degrees changes in the steering shaft pipe 23.

Unlike the prior art bicycle, the present invention provides an indirect driving operation by using a mechanism formed by a H-shaped tube and a connecting rod. As described above, the present invention provides riders an easy and precise control of a bicycle and less steering strength is required to ride the bicycle with present invention mechanism. With the present invention, the rider is able to ride the bicycle and make a turn easily without the need to worry about tough road conditions.

Although the present invention has been illustrated and described with reference to the preferred embodiment thereof, it should be understood that it is in no way limited to the details of such embodiment but is capable of numerous modifications within the scope of the appended claims.

What is claimed is:

1. A strength-saving steering mechanism for bicycles, comprising:

a bicycle body having a front stand pipe and said front stand pipe having a steering sheet on an upper end thereof;

a steering shaft pipe extending through said front stand pipe and connecting to a front wheel outrigger through a lower end of said steering shaft pipe;

a H-shaped tube having a bar pipe, a vertical pipe and a vertical insert pipe, said vertical insert pipe connecting to an inner end of said bar pipe while said vertical pipe connecting to an outer end of said bar pipe, said vertical insert pipe being inserted in an upper end of said steering shaft pipe;

an inside tube being inserted in said vertical pipe of said H-shaped tube and connected pivotally to said vertical pipe with an upper bearing and a lower bearing, a positioning block being disposed at a central bottom position of said inside tube and having a inclined plane on a top portion thereof, said positioning block comprising a tapped hole, a lower end of said inside tube extending through said vertical pipe and connecting to a positioning sheet;

a handle comprising a vertical handle rod and a horizontal handle rod, said vertical handle rod being inserted in an upper end of said inside tube and having a through hole, said vertical handle rod connecting to said positioning block with a bolt, a lower end of said vertical handle rod being an inclined plane; and a connecting rod, one end of which connecting to said positioning sheet and the other end connecting to said steering sheet;

wherein said horizontal handle rod, said vertical handle rod, said positioning block, said inside tube, said connecting rod and said steering sheet are for rotating said steering shaft pipe.

2. The strength-saving steering mechanism for bicycles as defined in claim 1, wherein one lower end of said vertical insert pipe is an inclined plane and a fixing block, with an inclined plane atop and a tapped hole, is disposed in said steering shaft pipe, and a top portion of said vertical insert pipe connects to said fixing block through a fixing screw 27.

3. The strength-saving steering mechanism for bicycles as defined in claim 1, wherein the distance from a joint of said positioning sheet and said connecting rod to an axis of said vertical pipe is two times the distance from the joint of said steering sheet and said connecting rod to an axis of said front stand pipe for rotating said lateral handle rod two degrees along with one degree rotation of said steering shaft pipe.

* * * * *